(12) United States Patent
Shibasaki

(10) Patent No.: US 9,967,433 B2
(45) Date of Patent: May 8, 2018

(54) GENERATING PRINT DATA INCLUDING DATA TO FORM A FLAT AND SMOOTH COLOR DEVELOPMENT LAYER AND DATA TO FORM A GLOSS LAYER

(71) Applicant: CANON KABUSHIKI KAISHA, Tokyo (JP)

(72) Inventor: Akira Shibasaki, Soka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/201,910

(22) Filed: Jul. 5, 2016

(65) Prior Publication Data

US 2017/0013172 A1    Jan. 12, 2017

(30) Foreign Application Priority Data

Jul. 6, 2015   (JP) ................................ 2015-135165
Jun. 15, 2016  (JP) ................................ 2016-119036

(51) Int. Cl.
| | |
|---|---|
| H04N 1/54 | (2006.01) |
| H04N 1/60 | (2006.01) |
| G06K 15/02 | (2006.01) |
| H04N 1/52 | (2006.01) |
| H04N 1/034 | (2006.01) |
| G06K 15/10 | (2006.01) |

(52) U.S. Cl.
CPC ........... *H04N 1/54* (2013.01); *G06K 15/1878* (2013.01); *H04N 1/60* (2013.01); *H04N 1/6008* (2013.01); *H04N 1/6016* (2013.01); *G06K 15/102* (2013.01); *G06K 15/1881* (2013.01); *H04N 1/034* (2013.01); *H04N 1/52* (2013.01)

(58) Field of Classification Search
None
See application file for complete search history.

(56) References Cited

U.S. PATENT DOCUMENTS

| 8,314,971 B2 * | 11/2012 | Nishiyama | H04N 1/4052 358/2.1 |
|---|---|---|---|
| 8,736,903 B2 * | 5/2014 | Koyatsu | G06F 3/1205 358/1.9 |
| 8,873,103 B2 * | 10/2014 | Tsuchiya | B41J 2/21 347/100 |

(Continued)

FOREIGN PATENT DOCUMENTS

| JP | 2004-299058 A | 10/2004 |
|---|---|---|
| JP | 2005-059592 A | 3/2005 |

*Primary Examiner* — Scott A Rogers
(74) *Attorney, Agent, or Firm* — Carter, Deluca, Farrell & Schmidt, LLP

(57) ABSTRACT

In printing, it is possible to more easily reduce a change in color that is caused by the surface form of an image to be formed. A color correction unit configured to correct color data representing a color by using a correction value in accordance with gloss data representing gloss, a color conversion unit configured to convert the corrected color data into color material amount data, a first generation unit configured to generate, based on the color material amount data, data that is used to form a color development layer among the print data and which makes the color development layer flat and smooth, and a second generation unit configured to generate, based on the gloss data, data that is used to form a glossy layer among the print data are included.

12 Claims, 14 Drawing Sheets

(56) References Cited

U.S. PATENT DOCUMENTS

| | | | | |
|---|---|---|---|---|
| 9,019,557 B2* | 4/2015 | Jinno | .................. | H04N 1/54 |
| | | | | 347/15 |
| 9,275,312 B2* | 3/2016 | Yukie | .................. | G06K 15/02 |
| 9,384,430 B2* | 7/2016 | Shibasaki | .............. | G06K 15/14 |
| 9,628,670 B2* | 4/2017 | Fukamachi | .......... | H04N 1/6097 |
| 9,733,872 B2* | 8/2017 | Tsuwano | .................. | G06F 3/12 |
| 2010/0110462 A1* | 5/2010 | Arai | .................. | G06T 15/506 |
| | | | | 358/1.9 |
| 2010/0177354 A1* | 7/2010 | Yoshida | .............. | B41J 11/0015 |
| | | | | 358/3.01 |
| 2011/0242556 A1* | 10/2011 | Jinno | .................. | H04N 1/54 |
| | | | | 358/1.9 |
| 2012/0113444 A1* | 5/2012 | Yoshida | .............. | H04N 1/6027 |
| | | | | 358/1.9 |
| 2013/0222817 A1* | 8/2013 | Suzuki | ................. | G03G 15/6585 |
| | | | | 358/1.1 |
| 2017/0104894 A1* | 4/2017 | Nishikawa | .......... | H04N 1/6019 |

* cited by examiner

| GLOSS DATA | CORRECTION VALUE | | |
|---|---|---|---|
| SPECULAR GLOSSINESS | $\Delta X_i$ | $\Delta Y_i$ | $\Delta Z_i$ |
| 0 | 0 | 0 | 0 |
| 10 | 1 | 1 | 1 |
| 20 | 2 | 2 | 2 |
| ⋮ | ⋮ | ⋮ | ⋮ |
| 100 | 10 | 10 | 10 |

| COLOR DATA | | | INK AMOUNT DATA | | | |
|---|---|---|---|---|---|---|
| X VALUE | Y VALUE | Z VALUE | CYAN | MAGENTA | YELLOW | BLACK |
| 0 | 0 | 0 | 250 | 250 | 250 | 200 |
| 0 | 0 | 50 | 250 | 250 | 120 | 100 |
| 0 | 0 | 100 | 250 | 250 | 0 | 0 |
| 0 | 50 | 0 | 250 | 120 | 250 | 100 |
| 0 | 50 | 50 | 250 | 0 | 250 | 0 |
| ⋮ | ⋮ | ⋮ | ⋮ | ⋮ | ⋮ | ⋮ |
| 100 | 100 | 100 | 0 | 0 | 0 | 0 |
| 1001 | 1002 | 1003 | 1004 | 1005 | 1006 | 1007 |

FIG.10B

| COLOR DATA | | | INK AMOUNT DATA | | | |
|---|---|---|---|---|---|---|
| X VALUE | Y VALUE | Z VALUE | CYAN | MAGENTA | YELLOW | BLACK |
| 0 | 0 | 0 | 255 | 255 | 255 | 255 |
| 0 | 0 | 50 | 255 | 255 | 128 | 128 |
| 0 | 0 | 100 | 255 | 255 | 0 | 0 |
| 0 | 50 | 0 | 255 | 128 | 255 | 128 |
| 0 | 50 | 50 | 255 | 0 | 255 | 0 |
| ⋮ | ⋮ | ⋮ | ⋮ | ⋮ | ⋮ | ⋮ |
| 100 | 100 | 100 | 0 | 0 | 0 | 0 |
| 2001 | 2002 | 2003 | 2004 | 2005 | 2006 | 2007 |

GENERATING PRINT DATA INCLUDING DATA TO FORM A FLAT AND SMOOTH COLOR DEVELOPMENT LAYER AND DATA TO FORM A GLOSS LAYER

BACKGROUND OF THE INVENTION

Field of the Invention

The present invention relates to a technique to reproduce colors and gloss of an object to be printed on printed matter.

Description of the Related Art

In the field of duplication of cultural properties or the like, the technique is known that reproduces an object, such as an oil painting, with a printer by also obtaining gloss and the form of the object, in addition to colors of the object, in order to reproduce a texture of the object in more detail.

Japanese Patent Laid-Open No. 2004-299058 has disclosed the technique to stack and form a color development layer for reproducing colors, a glossy layer for reproducing gloss, and a form layer for reproducing a form on a printing medium by using a UV curable ink jet printer.

However, with the method described in Japanese Patent Laid-Open No. 2004-299058, there is a possibility that the color of an image to be observed will change due to the influence of the glossy layer formed on the color development layer. The cause of this is explained by using FIG. 1. FIG. 1 is a schematic diagram showing an example of a section of printed matter formed on a printing medium. In an area A shown in FIG. 1, a color development layer 102 is formed on a printing medium 101 and further, a glossy layer 103 is formed on the color development layer 102. On the other hand, in an area B, the color development layer 102 is formed on the printing medium 101, but the glossy layer 103 is not formed. In the case where light from a light source enters the printed matter thus formed, the behavior of the light reflected from the surface changes from area to area. In other words, in the area A where the glossy layer is formed on the color development layer, the light to be reflected from the surface is reflected irregularly, and therefore, there is a possibility that the color that is observed in the area A is different from the color that is observed in the area B. The light that is reflected irregularly from the surface of an object as described above is called surface-scattered light. Further, there is a possibility that the behavior of the surface-scattered light changes also depending on the form (e.g., thickness) of the glossy layer that is formed on the color development layer.

Consequently, the technique of color correction that takes into consideration the influence of surface-scattered light has been proposed. Japanese Patent Laid-Open No. 2005-59592 has disclosed the technique to reduce the difference in density between the density of an image and the density of an observed image by correcting the image signal representing the density of the image to be printed by taking into consideration the influence of surface-scattered light in the roughness layer (layer that reproduces the surface roughness of the image to be printed) that is formed on the uppermost surface of the printed matter.

However, with the method described in Japanese Patent Laid-Open No. 2005-59592, the image signal is corrected in accordance with not only the form (roughness) of the surface of the image to be printed but also the density of the image, and therefore, the number of correction values increases. Consequently, there is a possibility that the color correction that takes into consideration the influence of surface-scattered light will become complicated in the method described in Japanese Patent Laid-Open No. 2005-59592.

SUMMARY OF THE INVENTION

The apparatus according to the present invention is an apparatus that generates print data for a printing apparatus to form printed matter including a color development layer to reproduce a color and a glossy layer to reproduce gloss, and the apparatus includes a color correction unit configured to correct color data representing the color by using a correction value in accordance with gloss data representing the gloss, a color conversion unit configured to convert the corrected color data into color material amount data, a first generation unit configured to generate, based on the color material amount data, data that is used to form the color development layer among the print data and which makes the color development layer flat and smooth, and a second generation unit configured to generate, based on the gloss data, data that is used to form the glossy layer among the print data.

Further features of the present invention will become apparent from the following description of exemplary embodiments (with reference to the attached drawings).

BRIEF DESCRIPTION OF THE DRAWINGS

FIG. 4 is a schematic diagram showing a table that is held by a correction value holding unit;

FIGS. 10A and 10B are schematic diagrams each showing a color separation table;

DESCRIPTION OF THE EMBODIMENTS

Hereinafter, with reference to the drawings, embodiments for embodying the present invention are explained. Configurations shown in the following embodiments are merely exemplary and the present invention is not limited to the configurations shown schematically.

First Embodiment

As described above, in the case where an observer observes printed matter in which a glossy layer is provided on a color development layer, there is a possibility that the observed color differs from the original color of an image to be printed because of the influence of surface-scattered light that is reflected from the surface of the glossy layer. Consequently, in order to reproduce a desired color, it is necessary to perform color correction that takes into consideration the change in the color to be observed.

The behavior of the surface-scattered light is determined by the refractive index of the surface of printed matter and the surface form of the printed matter.

There is a tendency for the refractive index of the surface of printed matter not to change so much depending on the kind of ink that is used to form the printed matter. Further, the refractive index of the surface of printed matter is characterized in that the refractive index does not change so much depending on the wavelength of light that enters. Consequently, in the case where the surface form of printed matter is the same, there is a tendency for the influence of surface-scattered light not to depend on the kind of ink to be used or the wavelength of light that enters.

The surface form of printed matter is determined by the form of the color development layer and the form of the glossy layer that is formed on the color development layer. Consequently, in the case where the form of the color development layer is formed so as to be flat and smooth irrespective of input color data, the surface form of the printed matter is determined only by the form of the glossy layer, and therefore, it can be thought that the influence of the surface-scattered light is no longer dependent on the form of the color development layer.

The present embodiment has been made based on the concept such as this. In other words, in the present embodiment, by forming the color development layer so as to be flat and smooth, color correction that takes into consideration only the form of the glossy layer is performed, and therefore, simple correction is implemented.

As above, qualitative explanation is given, and hereinafter, explanation is given by using mathematical expressions.

Figure 1:
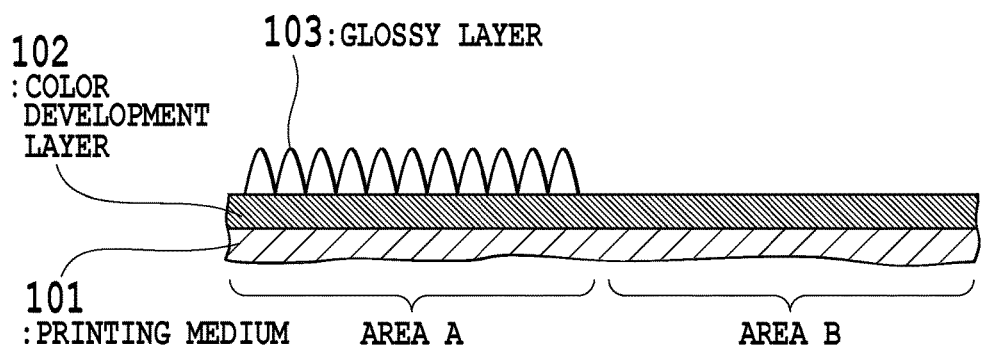
FIG. 1 is a schematic diagram showing an example of a section of an image that is formed on a printing medium.

It is possible to represent the observed color by using spectral reflectance that indicates, for each wavelength, an amount of reflection of light having entered an object from a light source. In the case where the spectral reflectance of the area where a glossy layer is formed on a flat and smooth color development layer, as the area A shown in FIG. 1, is taken to be $R_{i,j}(\lambda)$, $R_{i,j}(\lambda)$ is expressed as expression 1. In expression 1, a subscript i represents the kind of glossy layer. A subscript j represents the kind of color development layer. Here, the kind of glossy layer is determined by classifying glossy layers according to the glossiness of the glossy layer, the form of the glossy layer, the number of stacking times of the glossy pattern, etc. The kind of color development layer is determined by classifying color development layers according to characteristics other than the form, such as the color of the color development layer. Then, $\lambda$ represents the wavelength of light. $R_{0,j}(\lambda)$ represents the spectral reflectance of the area where neither color development layer nor glossy layer is formed (i.e., the spectral reflectance of the area including only a printing medium), or the spectral reflectance of the area where only the flat and smooth color development layer is formed, as the area B shown in FIG. 1. Further, $\Delta R_i$ represents a difference in spectral reflectance between the area where the glossy layer is not formed and the area where the glossy layer is formed. In other words, $\Delta R_i$ represents the influence of surface-scattered light. Here, $\Delta R_i$ is a value that does not depend on the wavelength of incident light or the kind of color development layer, but depends only on the kind of glossy layer as described above.

$$R_{i,j}(\lambda)=R_{0,j}(\lambda)+\Delta R_i \quad \text{(expression 1)}$$

As a method of quantifying a color, there is an XYZ colorimetric system. In the XYZ colorimetric system, a color is expressed by XYZ values. Specifically, by integrating the value obtained by multiplying the spectral characteristics of the light source, the spectral reflectance of the printed matter, and the color matching function in the visual system, the XYZ values are obtained. In the case where the observed color is represented in the XYZ colorimetric system based on expression 1, expressions 2 to 4 are obtained.

$$X_{i,j}=X_{0,j}+\Delta X_i \quad \text{(expression 2)}$$

$$Y_{i,j}=Y_{0,j}+\Delta Y_i \quad \text{(expression 3)}$$

$$Z_{i,j}=Z_{0,j}+\Delta Z_i \quad \text{(expression 4)}$$

Here, the subscript i represents the kind of glossy layer. The subscript j represents the kind of color development layer. Like $\Delta R_i$, $\Delta X_i$, $\Delta Y_i$, and $\Delta Z_i$ are values that depend on the kind of glossy layer but do not depend on the wavelength of light that enters or the kind of color development layer.

By forming the color development layer so as to be flat and smooth and performing color correction by using expression 2 to expression 4 as described above, simple color correction that takes into consideration only the kind of glossy layer is made possible.

Hereinafter, a print system that performs color correction by performing processing to subtract $\Delta X_i$, $\Delta Y_i$, and $\Delta Z_i$ described above from input image data is explained.

(Outline of Print System)

Figure 2:
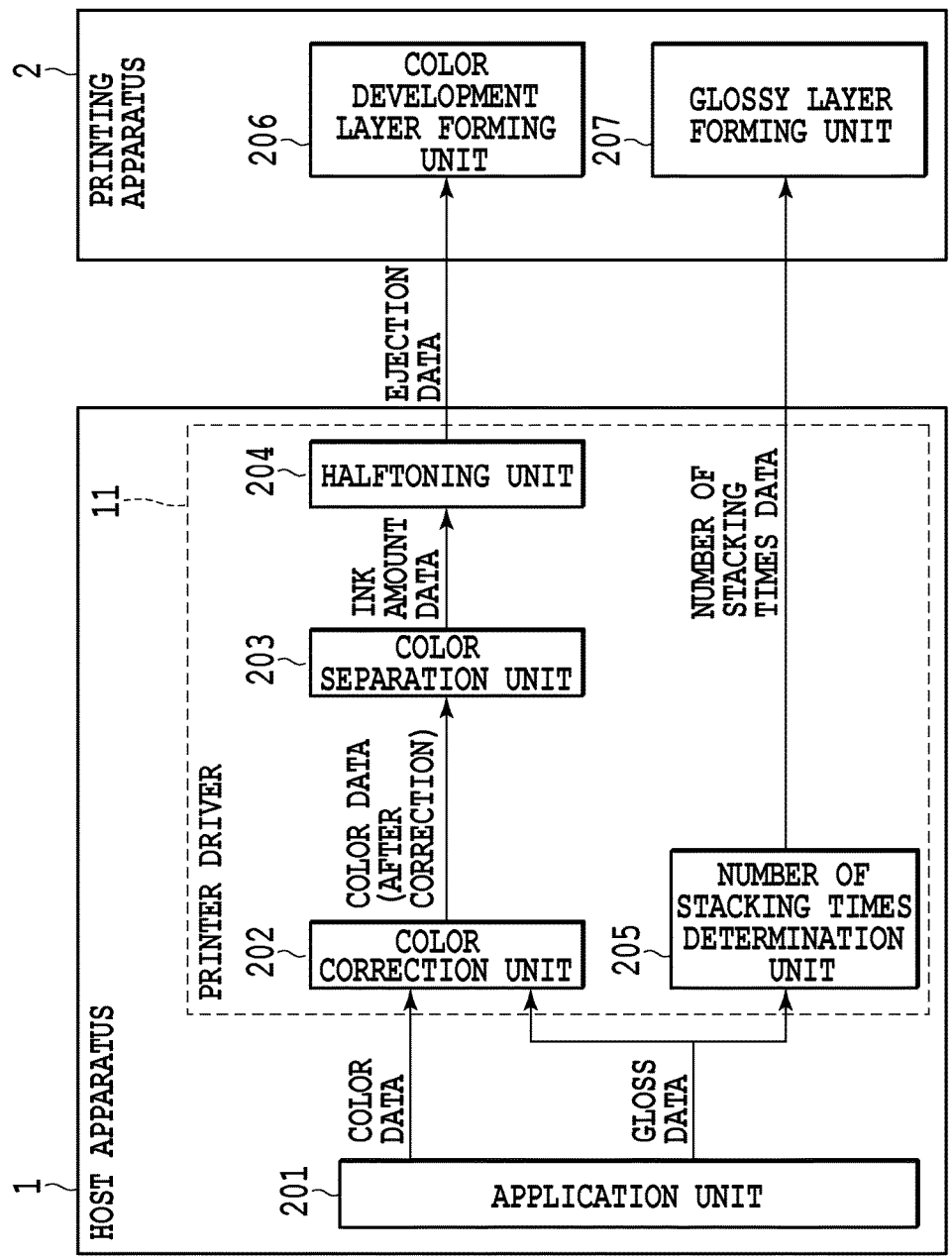
FIG. 2 is a block diagram showing a configuration of a print system according to a first embodiment.

FIG. 2 is a block diagram showing a configuration of a print system according to the first embodiment As shown in FIG. 2, the print system according to the present embodiment includes a host apparatus 1 and a printing apparatus 2.

The host apparatus 1 is, for example, a personal computer (PC). The host apparatus 1 takes in print data via various storage media, for example, such as a memory card and a CD-ROM. The print data is, for example, color data measured by a measuring instrument that measures a color, and gloss data measured by a measuring instrument that measures gloss. It may also be possible for the host apparatus 1 to take in print data on a web via the Internet. Further, it may also be possible for the host apparatus 1 to take in print data from a measuring instrument capable of communication. Print data only needs to be data representing colors and gloss of an object to be printed and may not be actually measured data. Consequently, it may also be possible to take a computer graphic (CG) image to be an object to be printed. Further, it may also be possible for the host apparatus 1 to use print data generated by the host apparatus 1 itself.

The printing apparatus 2 is, for example, an ink jet printer. In the present embodiment, the printing apparatus 2 performs printing by using four kinds (cyan, magenta, yellow, black) of basic ink and a clear ink, which are ultraviolet curable inks. Consequently, the printing apparatus 2 includes print heads (not shown) that eject these five kinds of ultraviolet curable ink. Further, the printing apparatus 2 includes an ultraviolet irradiation apparatus (not shown) that cures and fixes the ejected ink onto a printing medium. It may also be possible for the printing apparatus 2 to use a color material other than the above-described basic inks as a color material or to use a clear color material other than the clear ink as a clear color material.

Hereinafter, the ink that is a printing material is represented in English, such as Cyan, Magenta, Yellow, Black, and Clear. Further, a color or the ink amount data of the color is represented by one upper-case letter or a combination of one upper-case letter and one lower-case letter, such as C, M, Y, K, and Cl. In other words, C represents a cyan color or the ink amount data of the cyan color. M represents a magenta color or the ink amount data of the magenta color. Y represents a yellow color or the ink amount data of the yellow color. K represents a black color or the ink amount data of the black color. Cl represents a clear color or the ink amount data of the clear color. Further, in the present specification, a "pixel" refers to the minimum unit that can represent a tone level and is the minimum unit on which image processing of multivalued data of a plurality of bits (processing, such as color correction, color separation, halftoning, and determination of the number of stacking times, to be described later) is performed.

Here, the internal configuration of the host apparatus 1 and the printing apparatus 2 is explained.

The host apparatus 1 has an application unit 201 and a printer driver 11. The application unit 201 and the printer driver 11 are implemented by, for example, programs that run on an operation system (OS) of the host apparatus 1.

The host apparatus 1 displays print data that is taken in on a monitor unit (not shown). A user inputs instructions to edit or process the print data displayed on the monitor unit to the application unit 201 via an operation unit (not shown).

The application unit 201 edits or processes the input print data based on the instructions input by the user. The application unit 201 delivers the print data on which the editing processing or the like has been performed to the printer driver 11.

The printer driver 11 has a color correction unit 202, a color separation unit 203, a halftoning unit 204, and a number of stacking times determination unit 205.

The color correction unit 202 receives color data and gloss data from the application unit 201. The color correction unit 202 corrects the color data based on the gloss data. The color correction unit 202 delivers the color data after the correction to the color separation unit 203.

The color separation unit 203 holds in advance a table for converting color data into color material amount data (hereinafter, referred to as a color separation table or a color conversion table). In the present embodiment, the color separation unit 203 holds a color separation table for converting color data into color material amount data. The color separation unit 203 finds the ink amount data C, M, Y, and K corresponding to a combination of inks for reproducing the color represented by the color data after the correction by using the color separation table. The color separation unit 203 outputs 8-bit data for each color as the ink amount data.

The halftoning unit 204 generates ejection data. In the present embodiment, the halftoning unit 204 converts each piece of the 8-bit ink amount data C, M, Y, and K into 1-bit ejection data by using the well-known technique, such as the error diffusion method and the threshold mask method having frequency characteristics, such as blue noise characteristics and green noise characteristics. The ejection data is data for determining presence/absence of a dot corresponding to each pixel on a printing medium.

The number of stacking times determination unit 205 receives gloss data from the application unit 201 and determines the number of stacking times of a gloss pattern necessary to reproduce the gloss represented by the gloss data. The number of stacking times determination unit 205 generates number of stacking times data representing the determined number of stacking times.

The printer driver 11 sends the ejection data and the number of stacking times data generated by the number of stacking times determination unit 205 to the printing apparatus 2 at appropriate timing.

The printing apparatus 2 has a color development layer forming unit 206 and a glossy layer forming unit 207.

The color development layer forming unit 206 forms a color development layer for reproducing a color on a printing medium. Specifically, the color development layer forming unit 206 drives the print head based on the ejection data received from the halftoning unit 204 to cause ink to be ejected onto a printing medium and further controls the ultraviolet irradiation apparatus to cure the ink. At this time, the color development layer forming unit 206 forms the surface of the color development layer so as to be flat and smooth by filling gaps in the form of the color development layer with a clear ink, which occur in the case where the color development layer is formed by only the inks of C, M, Y, and K. The processing to form the surface of the color development layer so as to be flat and smooth will be described later.

The glossy layer forming unit 207 forms a predetermined gloss pattern based on the number of stacking times data received from the printer driver 11. Specifically, the glossy layer forming unit 207 drives the print head to cause the clear ink to be ejected onto the color development layer and further controls the ultraviolet irradiation apparatus to cure the clear ink, and thus, forms a gloss pattern. The glossy layer forming unit 207 performs this processing the number of times corresponding to the number of staking times indicated by the number of stacking times data.

By the processing of the color development layer forming unit 206 and the glossy layer forming unit 207, printed matter in which a glossy layer is provided on a color development layer is completed.

Hereinafter, the processing of the print system of the present embodiment is explained in detail.
(Processing of Application Unit)

The application unit 201 performs processing to create color data and gloss data.

In the present embodiment, color data is represented by XYZ values in the XYZ colorimetric system. It may also be possible to represent color data by RGB values in the sRGB colorimetric system or L*a*b values in the CIEL*a*b colorimetric system. In this case, the application unit 201 is only required to convert the format of the color data into the format of XYZ values and to deliver the color data after the conversion to the color correction unit 202.

The gloss data is the value of the "specular glossiness" measured by the well-known method or the value of the "image definition" measured by the well-known method. The gloss data is not necessarily limited to the above-described value, and may be a value measured by another method. For example, an angle formed by the direction, in which the amount of reflected light becomes half the amount of regularly reflected light, and the regular reflection direction is measured in the vicinity of the regular reflection direction and an inverse function of the angle may be taken to be gloss data. In the present embodiment, the specular glossiness is taken to be the gloss data.

The application unit 201 delivers the gloss data to the color correction unit 202 and the number of stacking times determination unit 205.
(Processing of Color Correction Unit)

The color correction unit 202 that characterizes the present embodiment corrects color data by taking into consideration the change in the observed color, which is caused by the influence of surface-scattered light.

Figure 3:
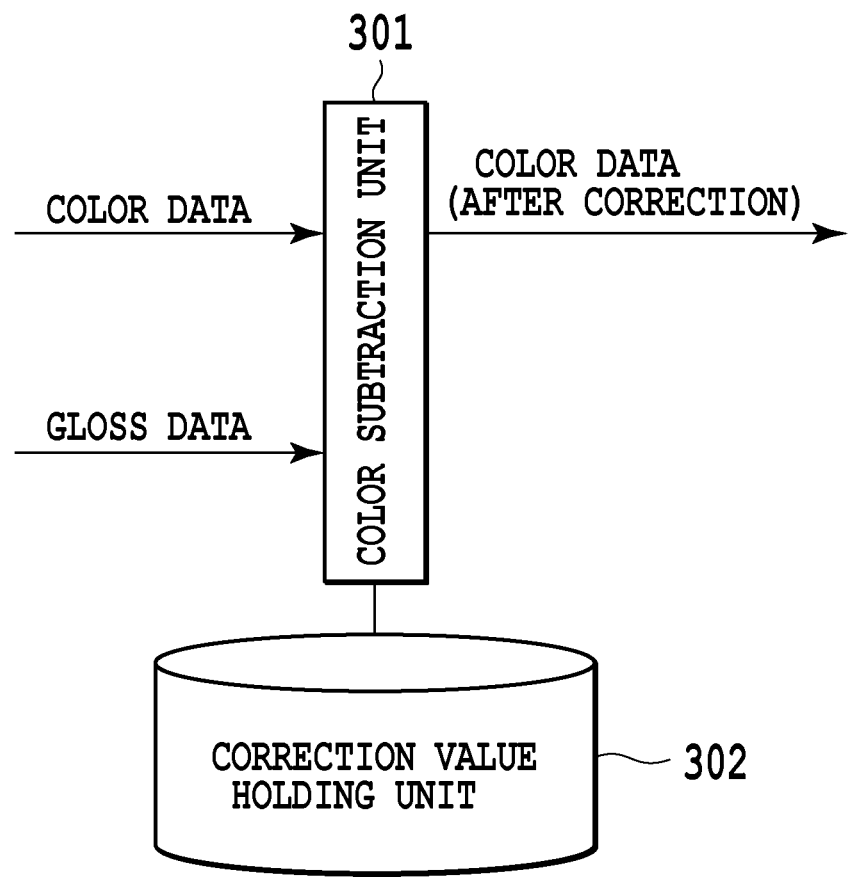
FIG. 3 is a block diagram showing a configuration of a color correction unit.

FIG. 3 is a block diagram showing a configuration of the color correction unit 202.

The color correction unit 202 has a color subtraction unit 301 and a correction value holding unit 302.

The color subtraction unit 301 subtracts the correction value in accordance with input gloss data from input color data.

The correction value holding unit 302 holds correction values in accordance with gloss data. In the present embodiment, the correction value holding unit 302 holds a table indicating a correspondence between gloss data and correction values. FIG. 4 is a schematic diagram showing a table held by the correction value holding unit 302. A column 401 shown in FIG. 4 indicates gloss data (specular glossiness) and columns 402 to 404 indicate correction values (the above-described $\Delta X_i$, $\Delta Y_i$, $\Delta Z_i$) in accordance with each piece of the gloss data. The method of acquiring correction values that are stored in the columns 402 to 404 will be described later.

Figure 5:
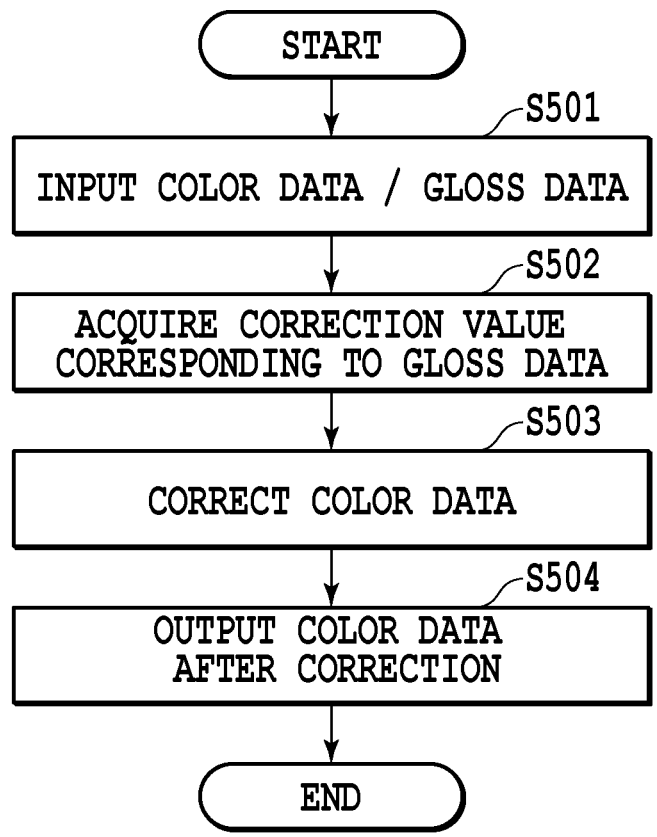
FIG. 5 is a flowchart showing an operation of the color correction unit.

FIG. 5 is a flowchart showing an operation of the color correction unit 202.

The color subtraction unit 301 of the color correction unit 202 inputs color data and gloss data (step S501). At this time, based on the received gloss data, the color subtraction unit 301 determines the number of stacking times of the gloss pattern that is formed on the color development layer. The number of stacking times of the gloss pattern is determined based on the information indicating a correspondence between the number of stacking times and gloss (e.g., specular glossiness). It is possible to acquire the information by measuring printed matter in which the gloss pattern is formed the number of stacking times specified in advance by using a gloss measuring instrument. The information is stored in, for example, in a storage unit (not shown) or the like included in the host apparatus 1.

Here, it is assumed that the color subtraction unit 301 determines that the number of stacking times corresponding to the received gloss data to be i. The color subtraction unit 301 acquires the color correction values $\Delta X_i$, $\Delta Y_i$, and $\Delta Z_i$ in accordance with the input gloss data by referring to the table shown in FIG. 4, which is held by the correction value holding unit 302 (step S502).

Next, the color subtraction unit 301 subtracts $\Delta X_i$, $\Delta Y_i$, and $\Delta Z_i$ from the color data X, Y, and Z, respectively, by using expressions below (step S503).

$$X \leftarrow X - \Delta X_i \quad \text{(expression 5)}$$

$$Y \leftarrow Y - \Delta Y_i \quad \text{(expression 6)}$$

$$Z \leftarrow Z - \Delta Z_i \quad \text{(expression 7)}$$

Finally, the color subtraction unit 301 outputs the corrected color data X, Y, and Z (step S504). In this manner, in the color correction unit 202, the color correction that takes into consideration the change in the observed color, which is caused by the influence of surface-scattered light, is performed.

Figure 6:
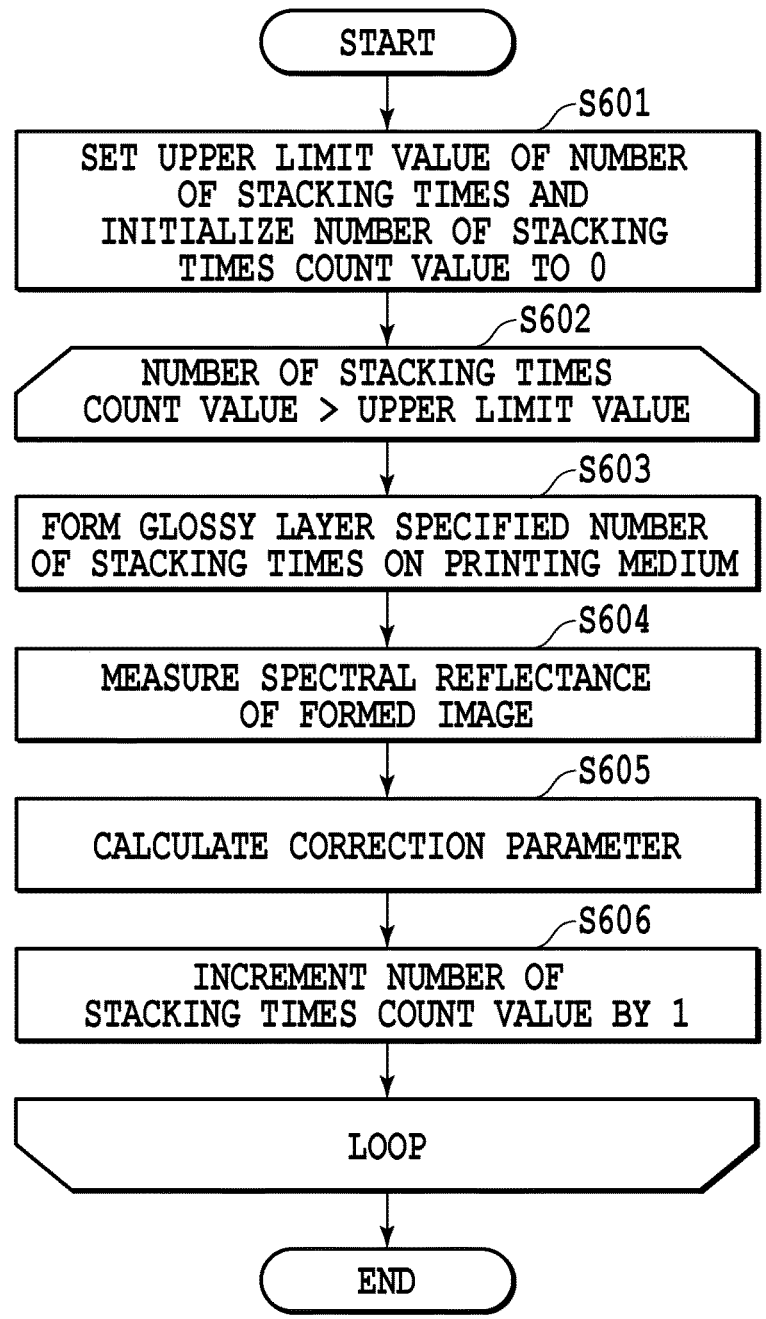
FIG. 6 is a flowchart showing acquisition processing of correction values in accordance with gloss data.

Here, the method of acquiring the correction value in accordance with gloss data is explained. FIG. 6 is a flowchart showing processing to acquire the correction value in accordance with gloss data.

The printer driver 11 of the host apparatus 1 starts the processing shown in FIG. 6 based on instructions to start processing by a user or the like.

First, the printer driver 11 initializes the number of stacking times count value to 0 as well as setting an upper limit value of the number of stacking times of the gloss pattern (step S601). The upper limit value of the number of stacking times is set in accordance with the type, performance, etc., of the printer. Any value may be set as the upper limit value of the number of stacking times. Further, the upper limit value of the number of stacking times may be set by a user or the like.

The printer driver 11 repeatedly performs the processing at steps S603 to S606 until the number of stacking times count value exceeds the upper limit value of the number of stacking times (step S602).

After the processing at step S601, the printer driver 11 forms a sample (printed matter) on a printing medium by using the printing apparatus 2 (step S603). At this time, the printer driver 11 does not form the color development layer, but forms the glossy layer the number of stacking times indicated by the number of stacking times count value that is set at step S601.

Next, the printer driver 11 measures the spectral reflectance of the formed printed matter by using a measuring instrument (e.g., spectral reflection luminance meter) (step S604).

Then, based on an expression below, the printer driver 11 calculates a correction value corresponding to the number of stacking times indicated by the number of stacking times count value from the spectral reflectance acquired from the measuring instrument (step S605).

$$\Delta R_i = \frac{1}{N_\lambda} \sum_\lambda (R_i(\lambda) - R_0(\lambda)) \quad \text{(expression 8)}$$

Here, $R_i(\lambda)$ is the spectral reflectance in the case where light having a wavelength $\lambda$ is caused to enter the printed matter in which the gloss pattern is formed the number i of stacking times. $R_0(\lambda)$ is the spectral reflectance in the case where light having the wavelength $\lambda$ is caused to enter a printing medium for which the number of stacking times of the gloss pattern is 0, i.e., a single printing medium on which no glossy layer is formed. $N_2$ is the number of measured wavelengths. $\Delta R_i$, is the correction value of the printed matter in which the gloss pattern is formed the number i of stacking times. By converting the spectral reflectance $\Delta R_i$ into the XYZ values, the correction values $\Delta X_i$, $\Delta Y_i$, and $\Delta Z_i$ that depend only on the kind of glossy layer are calculated as below.

$$X_{i,j} = X_{0,j} + \Delta X_i \quad \text{(expression 9)}$$

$$Y_{i,j} = Y_{0,j} + \Delta Y_i \quad \text{(expression 10)}$$

$$Z_{i,j} = Z_{0,j} + \Delta Z_i \quad \text{(expression 11)}$$

The printer driver 11 associates the correction values acquired at step S605 with the gloss data corresponding to the number i of stacking times and stores them in the table shown in FIG. 4, which is held by the correction value holding unit 302.

The printer driver 11 increments the number of stacking times count value by 1 (step S606).

(Processing of Number of Stacking Times Determination Unit)

The number of stacking times determination unit 205 receives gloss data from the application unit 201 and determines the number of stacking times of the gloss pattern for reproducing gloss indicated by the gloss data. The number of stacking times determination unit 205 determines the number of stacking times of the gloss pattern based on the above-described information indicating a correspondence between the number of stacking times and gloss.

(Processing of Color Development Layer Forming Unit)

Figure 7:
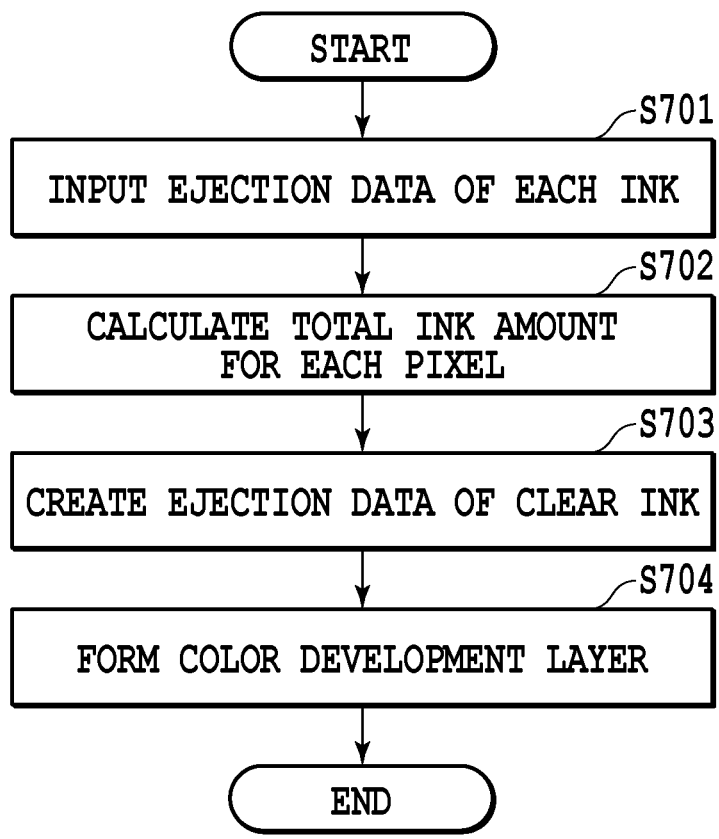
FIG. 7 is a flowchart showing an operation of a color development layer forming unit.

The color development layer forming unit 206 forms a color development layer on a printing medium based on the ejection data having been converted in the halftoning unit 204. At this time, the color development layer forming unit 206 forms the color development layer so as to be flat and smooth. FIG. 7 is a flowchart showing an operation of the color development layer forming unit 206.

The color development layer forming unit 206 inputs the ejection data of each ink (step S701). In other words, the color development layer forming unit 206 inputs the ejection data of cyan, magenta, yellow, and black.

Then, the color development layer forming unit 206 calculates the total ink amount for each pixel (step S702). For example, the color development layer forming unit 206 refers to the ejection data of each ink for each pixel and counts the number of dots to be ejected.

Next, the color development layer forming unit 206 creates the ejection data of the clear ink (step S703). At this time, the color development layer forming unit 206 creates the ejection data of the clear ink so that the total value of the ejection data of each ink including the clear ink becomes uniform for each pixel.

Finally, the color development layer forming unit 206 forms the color development layer based on the ejection data of the inks including the clear ink (step S704). The color development layer forming unit 206 causes the print head to scan and the ink to be ejected, and performs ultraviolet irradiation while conveying a printing medium, and thus forms the color development layer.

In the present embodiment, the ejection data of the clear ink is created so that the total value of the ejection data of each ink becomes equal for each pixel and thus the color development layer is formed, but the method is not limited to this provided that it is possible to make the form of the color development layer flat and smooth. For example, it may also be possible to create the ejection data of the clear ink by taking into consideration a difference in thickness for each ink.

Further, it may also be possible for the host apparatus 1 to perform the above-described processing to create the ejection data of the clear ink. For example, it may also be possible for the halftoning unit 204 of the host apparatus 1 to create the ejection data of the clear ink and to deliver the ejection data to the color development layer forming unit 206.

(Processing of Glossy Layer Forming Unit)

The glossy layer forming unit 207 forms a gloss pattern determined in advance on the color development layer based on the number of stacking times data determined by the number of stacking times determination unit 205. In the present embodiment, by the method of stacking the gloss pattern, gloss is controlled, but the method is not limited to this. For example, it may also be possible to control gloss by controlling the timing of ultraviolet irradiation or by changing the kind of gloss pattern.

As above, according to the present embodiment, it is possible to more easily reduce the change in color that is caused by the surface form of an image to be formed. Further, in the color correction, it is necessary to take into consideration only the form of the glossy layer, and therefore, it is possible to reduce the number of correction values. Furthermore, the number of processes necessary for creation of a sample and for measurement, which are necessary to acquire correction values.

In the present embodiment, the case is explained where the number of stacking times count value is incremented by 1 in the processing at step S606, but in the case where, for example, the number of kinds of glossy layer is large, it may also be possible to increment the number of stacking times count value by a value greater than or equal to 2. In such a case, a correction value that is not acquired may be found by interpolation. According to such an aspect, it is not necessary to prepare samples in accordance with all the numbers of stacking times, and therefore, it is possible to further reduce the time required for creation of a sample and for measurement.

Further, in the present embodiment, explanation is given by taking the printing apparatus that performs color printing by using four kinds of basic ink, i.e., C, M, Y, and K as an example, but it is also possible to apply the present invention to a printing apparatus that performs monochrome printing.

Furthermore, in the present embodiment, the case where the printing apparatus 2 is an ink jet printing apparatus is taken as an example, but the printing apparatus 2 may be a printing apparatus of another printing type, such as an electrophotographic printer. In such a case, there is a possibility that the refractive index of the surface of the printed matter formed by an inkjet printing apparatus differs from the refractive index of the surface of the printed matter formed by a printing apparatus of another printing type. Consequently, in the case where the present invention is applied to a printing apparatus of another printing type, it is desirable to perform processing equivalent to that in the flow shown in FIG. 6 in the printing apparatus of another printing type and to acquire in advance correction values for the printing apparatus.

Second Embodiment

In the first embodiment, the method of performing correction of a color caused by the influence of surface-scattered light by performing correction of input color data is explained. In a second embodiment, a print system that reproduces a desired color by rewriting a color separation table in accordance with gloss data is explained. The method of forming a color development layer so as to be flat and smooth is the same as that of the first embodiment.

(Outline of Print System)

Figure 8:
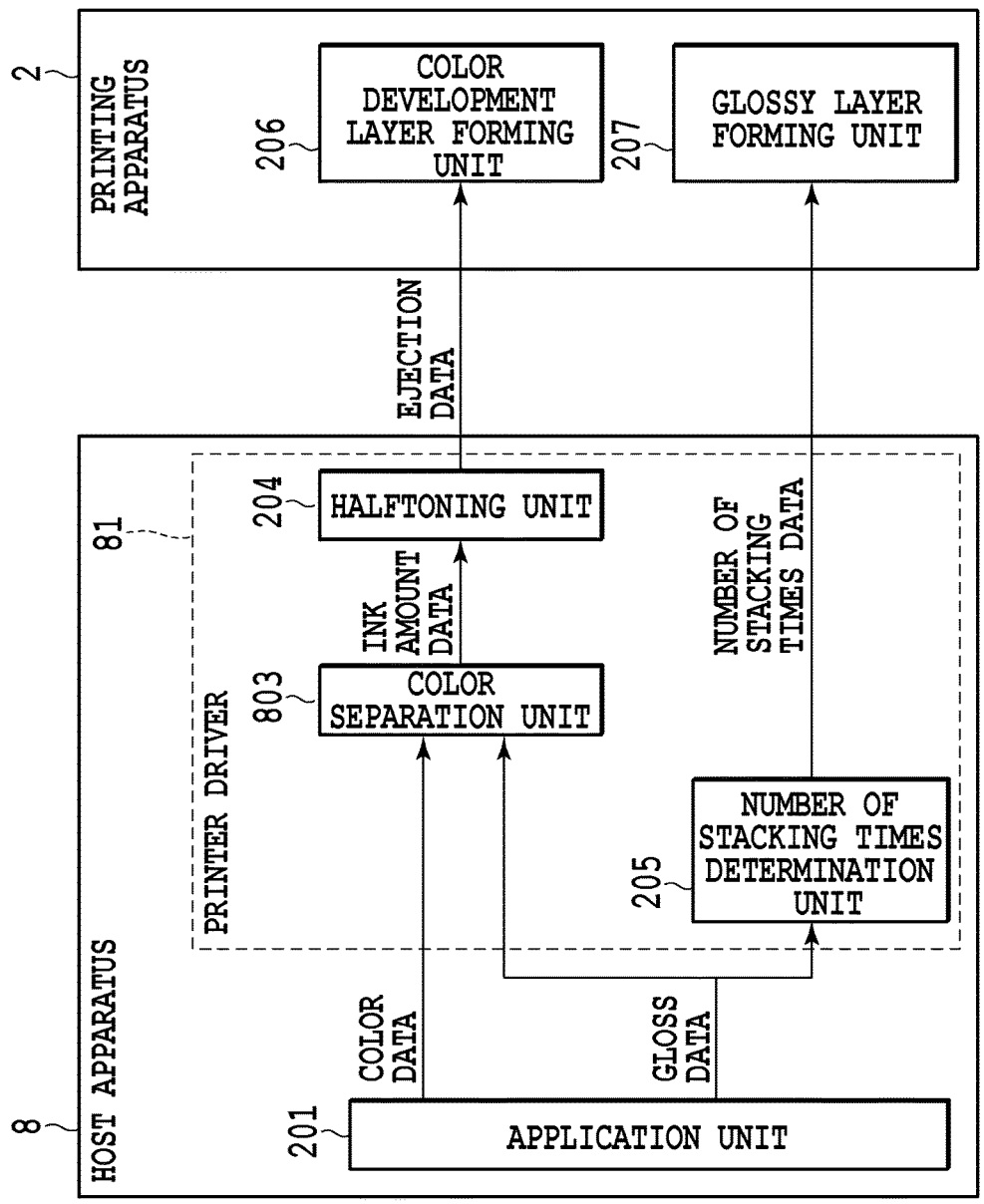
FIG. 8 is a block diagram showing a configuration of a print system according to a second embodiment.

FIG. 8 is a block diagram showing a configuration of a print system according to the second embodiment. Hereinafter, points different from those of the first embodiment are explained mainly.

The print system according to the second embodiment includes a host apparatus 8 and the printing apparatus 2.

The host apparatus 8 has the application unit 201 and a printer driver 81.

The printer driver 81 has a color separation unit 803, the halftoning unit 204, and the number of stacking times determination unit 205.

The color separation unit 803 performs processing to find ink amount data C, M, Y, and K corresponding to a combination of inks for reproducing a color represented by color data based on the color data and gloss data.

The other configurations of the print system according to the present embodiment are the same as those of the first embodiment, and therefore, explanation thereof is omitted.

(Processing of Color Separation Unit)

Figure 9:
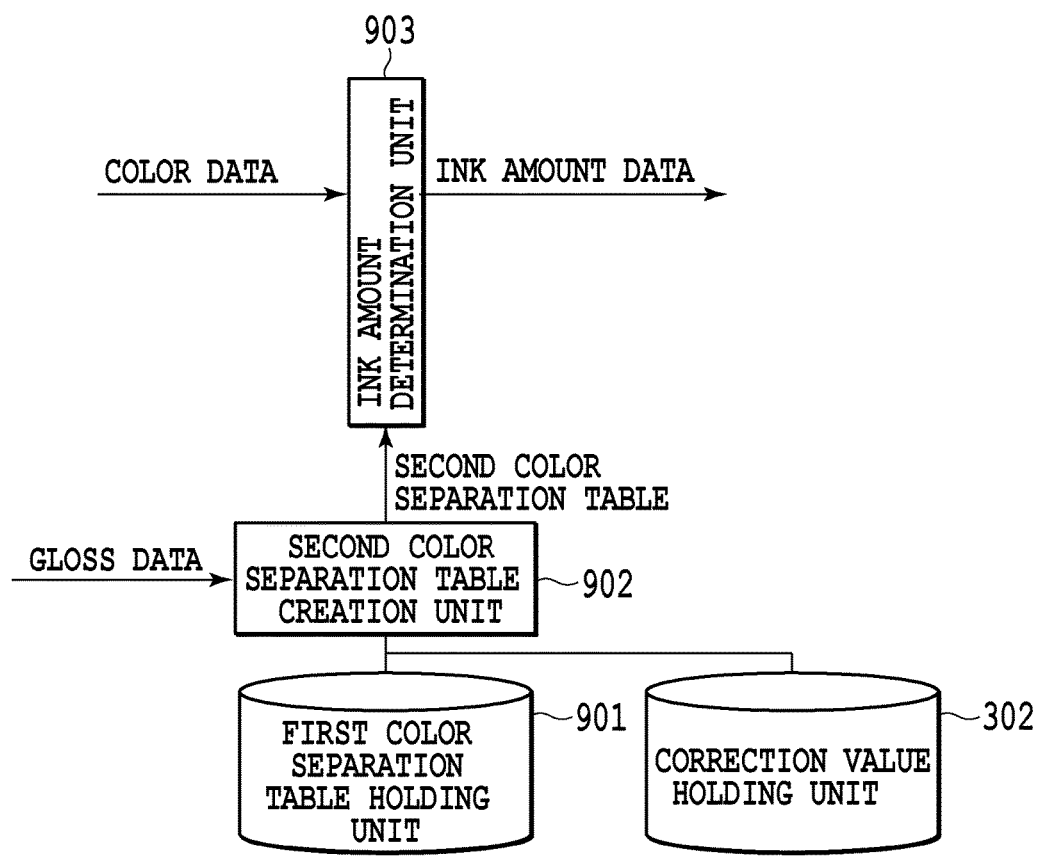
FIG. 9 is a block diagram showing a configuration of a color separation unit according to the second embodiment.

FIG. 9 is a block diagram showing a configuration of the color separation unit 803 according to the second embodiment.

The color separation unit 803 has a first color separation table holding unit 901, a second color separation table creation unit 902, an ink amount determination unit 903, and the correction value holding unit 302.

The first color separation table holding unit 901 holds a first color separation table. The first color separation table is a table that is used in the case where printed matter having no glossy layer on the color development layer is formed. In other words, the first color separation table is a table for converting color data (XYZ values) into ink amount data C, M, Y, and K without taking gloss data into consideration.

The second color separation table creation unit 902 refers to the first color separation table and generates a second color separation table based on gloss data. The second color separation table is a table that is used in the case where printed matter in which a glossy layer is provided on the color development layer is formed. In other words, the second color separation table is a table for converting color data (XYZ values) into ink amount data C, M, Y, and K in accordance with gloss data.

The ink amount determination unit 903 refers to the second color separation table and converts color data into ink amount data.

FIGS. 10A and 10B are schematic diagrams showing the first color separation table and the second color separation table, respectively. In FIG. 10A, the first color separation table is shown. In FIG. 10B, the second color separation table that is created from the first color separation table shown in FIG. 10A is shown.

Columns 1001 to 1003 shown in FIG. 10A and columns 2001 to 2003 shown in FIG. 10B indicate color data (XYZ values). Columns 1004 to 1007 shown in FIG. 10A and columns 2004 to 2007 shown in FIG. 10B indicate ink amount data C, M, Y, and K.

Figure 11:
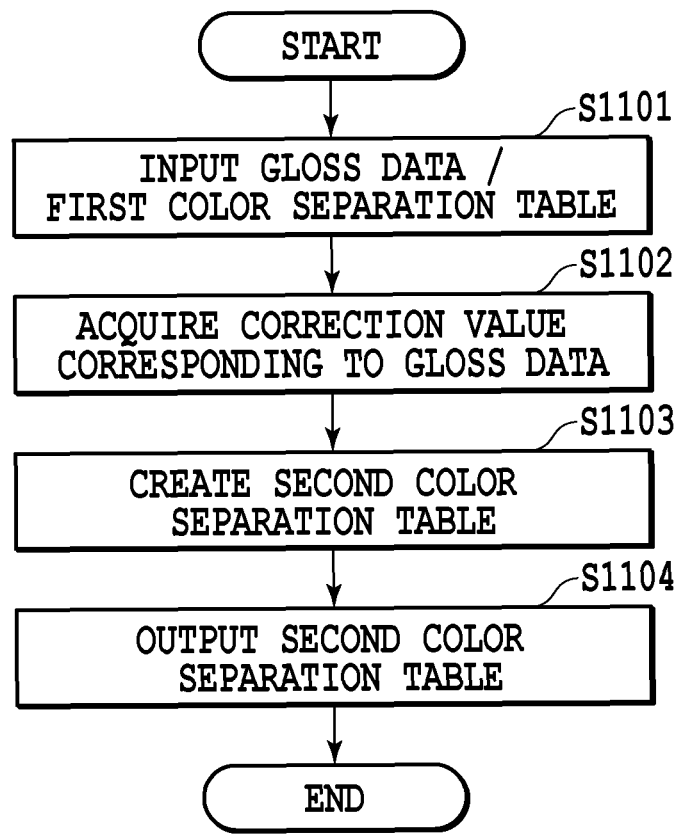
FIG. 11 is a flowchart showing an operation of a second color separation table creation unit.

FIG. 11 is a flowchart showing an operation of the second color separation table creation unit 902.

In the case where gloss data is input, the second color separation table creation unit 902 acquires the first color separation table from the first color separation table holding unit 901 (step S1101).

Next, the second color separation table creation unit 902 refers to the table shown in FIG. 4, which is held by the correction value holding unit 302, and acquires color correction values $\Delta X_i$, $\Delta Y_i$, and $\Delta Z_1$ in accordance with the input gloss data (step S1102).

Next, the second color separation table creation unit 902 refers to the first color separation table and creates a new color separation table (second color separation table) by replacing the ink amount data corresponding to X, Y, and Z with ink amount data corresponding to X', Y', and Z' defined by expressions below (step S1103). Due to this, the ink amount data C, M, Y, and K in accordance with the gloss data is stored in the columns 2004 to 2007 shown in FIG. 10B.

$$X' \leftarrow X - \Delta X_i \quad \text{(expression 12)}$$

$$Y' \leftarrow Y - \Delta Y_i \quad \text{(expression 13)}$$

$$Z' \leftarrow Z - \Delta Z_i \quad \text{(expression 14)}$$

For example, in the case where the second color separation table creation unit 902 replaces the ink amount data corresponding to color data (X=0, Y=0, Z=50), first, the second color separation table creation unit 902 corrects the color data (X=0, Y=0, Z=50) by using the input gloss data and the expressions described above. Next, the second color separation table creation unit 902 acquires the ink amount data corresponding to the color data X', Y', and Z' after the correction from the first color separation table. Here, it is assumed that as the ink amount data corresponding to the color data X', Y', and Z' after the correction, C=255, M=255, Y=128, and K=128 are acquired. Then, the second color separation table creation unit 902 allocates the acquired ink amount data (C=255, M=255, Y=128, K=128) to the ink amount data corresponding to the color data (X=0, Y=0, Z=50) of the second color separation table. Due to this, as shown in FIGS. 10A and 10B, the ink amount data corresponding to the color data (X=0, Y=0, Z=50) is replaced so as to change from C=250, M=250, Y=120, and K=100 into C=255, M=255, Y=128, and K=128. The second color separation table creation unit 902 performs this processing on all the color data of the first color separation table. In this manner, the second color separation table shown in FIG. 10B is created.

The second color separation table creation unit 902 outputs the second color separation table to the ink amount determination unit 903 (step S1104).

As explained above, in the present embodiment, a new color separation table is created by rewriting the color separation table in accordance with gloss data. Due to this, as in the first embodiment, it is possible to more easily implement color correction that takes into consideration the influence of surface-scattered light. Consequently, it is possible to obtain the same effects as those of the first embodiment.

Third Embodiment

In the first embodiment and the second embodiment, the method of performing color correction that takes into consideration only the form of the glossy layer in the printing apparatus that forms printed matter that reproduces colors and gloss is explained. However, there is a case where it is desired to also reproduce the form of an object, such as an oil painting, in order to reproduce a texture of the object in more detail, in addition to colors and gloss of the object, in the field of duplication of cultural properties or the like. Consequently, in the present embodiment, a method of performing color correction that takes into consideration only the form of a glossy layer in a printing apparatus that forms printed matter that also reproduces the form, in addition to colors and gloss of the object, is explained.

Figure 12:
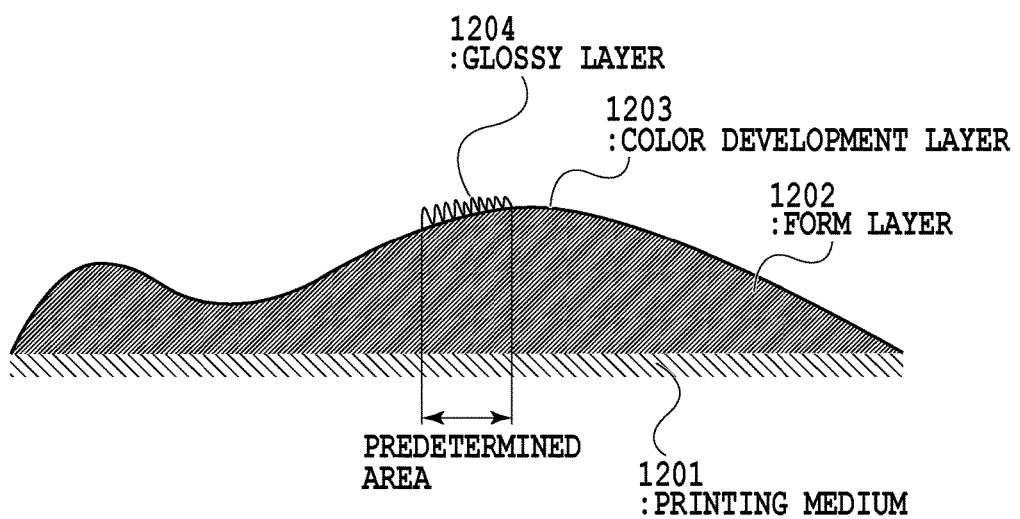
FIG. 12 is a schematic diagram showing an example of a section of an image that is formed on a printing medium in a third embodiment.

FIG. 12 is a schematic diagram showing an example of a section of an image formed on a printing medium in the third embodiment. On a printing medium 1201, a form layer 1202 is formed, and further, on the form layer 1202, a color development layer 1203 is formed, and furthermore, on the color development layer 1203, a glossy layer 1204 is formed. In order to perform color correction that takes into consideration only the form of the glossy layer, it is necessary to form a lower layer, which is the form layer plus the color development layer, so that the surface form of the lower layer becomes flat and smooth.

However, because it is also necessary to form printed matter that also reproduces the form, it is not possible to form the lower layer so that the height is constant across the entire surface of the printed matter although it is possible in the first embodiment. Consequently, in the third embodiment, as shown in FIG. 12, the lower layer is formed so that the surface form of the lower layer, which is the form layer plus the color development layer, becomes flat and smooth in a predetermined area of the printed matter. Specifically, first, the form layer is formed so as to reproduce the form, but the form layer is formed so that the surface of the form layer becomes flat and smooth for each predetermined area. The predetermined area referred to here is the area of an area that a human being can resolve, and for example, an area of 100 μm×100 μm. In the case of printed matter in which a long observation distance can be taken, the resolution at which a human being can recognize as a form becomes lower, and therefore, the area may take a comparatively large value, for example, 1 mm×1 mm. A smaller form having an area less than or equal to the predetermined area cannot be recognized by a human being as a form, but the form affects surface-scattered light. The color development layer is formed so that the surface becomes flat and smooth and the height of the color development layer is constant across the entire surface of the printed matter as in the first embodiment.

Due to this, also in the case where printed matter that also reproduces the form, in addition to colors and gloss, is formed, it is possible to form the lower layer whose surface form is flat and smooth, and therefore, it is possible to implement color correction that takes into consideration only the form of the glossy layer. In the present embodiment, explanation is given with the case where the method of the first embodiment is used as the color correction method that takes into consideration the influence of surface-scattered light, but it may also be possible to use the method of the second embodiment.

(Outline of Print System)

Figure 13:
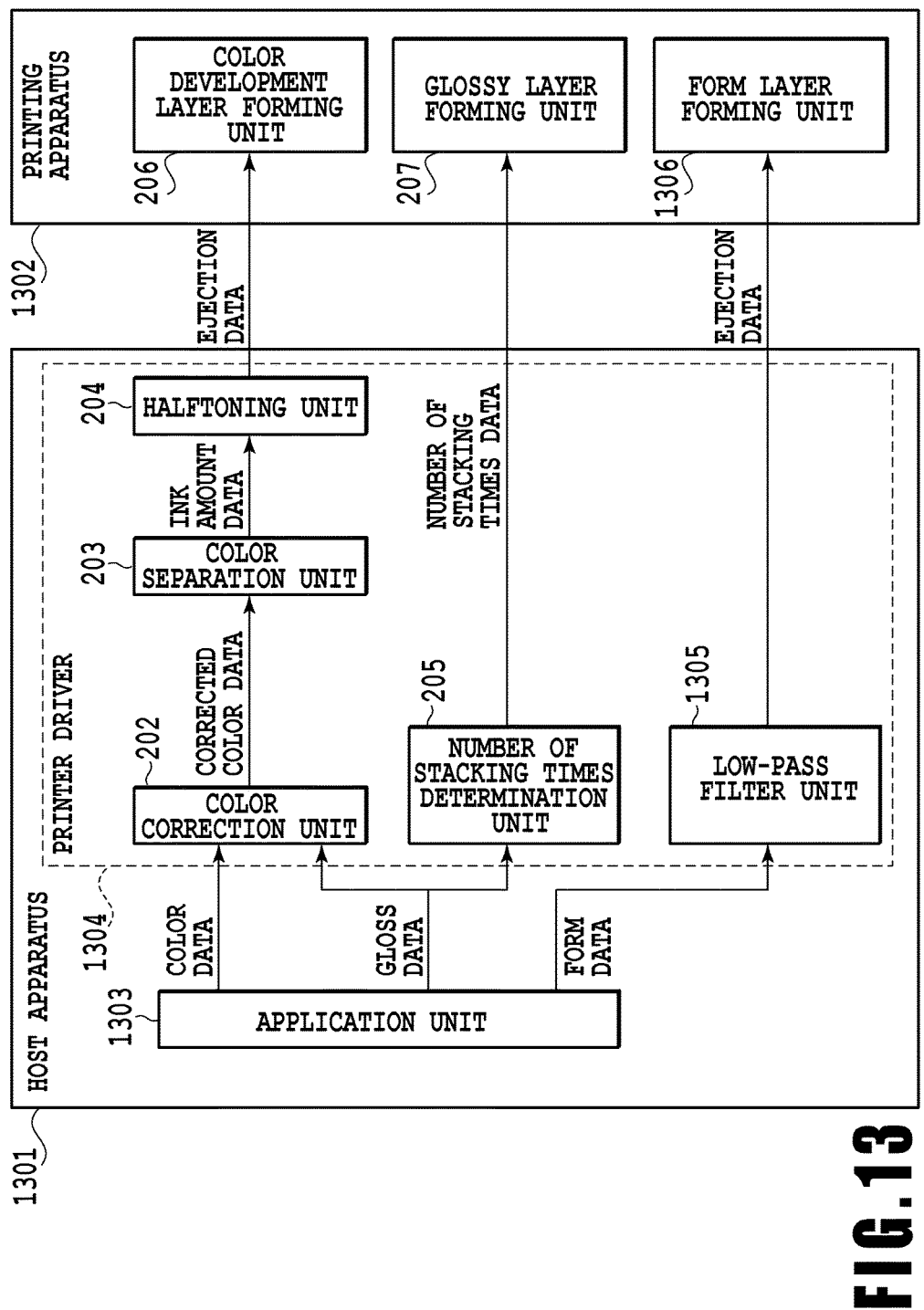
FIG. 13 is a block diagram showing a configuration of a print system according to the third embodiment.

FIG. 13 is a block diagram showing a configuration of a print system according to the third embodiment.

The print system according to the third embodiment includes a host apparatus 1301 and a printing apparatus 1302. The print data that is read by the host apparatus 1301 includes form data obtained by measuring a form by a measuring instrument that measures a form, in addition to color data and gloss data. The form data may not be actually measured data like the color data and the gloss data, and therefore, it may also be possible to take a computer graphic (CG) image as an object to be printed. Further, it may also be possible for the host apparatus 1301 to use form data generated by the host apparatus 1301 itself.

The host apparatus 1301 includes an application unit 1303 and a printer driver 1304. The application unit 1303 edits or processes input print data based on instructions input by a user. The application unit 1303 delivers the print data including the form data, on which the editing processing or the like has been performed, to the printer driver 1304. The printer driver 1304 has the color correction unit 202, the color separation unit 203, the halftoning unit 204, the number of stacking times determination unit 205, and a low-pass filter unit 1305. Although details will be described later, the low-pass filter unit 1305 receives the form data from the application unit 1303 and generates ejection data necessary to reproduce the form represented by the form data. The printing apparatus 1302 has the color development layer forming unit 206, the glossy layer forming unit 207, and a form layer forming unit 1306. The form layer forming unit 1306 forms a form layer for reproducing the form on a printing medium. Specifically, the form layer forming unit 1306 drives the print head based on the ejection data received from the low-pass filter unit 1305 to cause the clear ink to be ejected onto a printing medium and further controls the ultraviolet irradiation apparatus to cure the clear ink. The ink that is used to form the form layer is not limited to the transparent clear ink. It may also be possible to form the form layer by combining a white ink having a high reflectance, a black ink having a low transmittance, etc., in order to improve color development of the color development layer.

The other configurations of the print system according to the present embodiment are the same as those of the first embodiment, and therefore, explanation thereof is omitted.

(Processing of Low-Pass Filter Unit)

Figure 14:
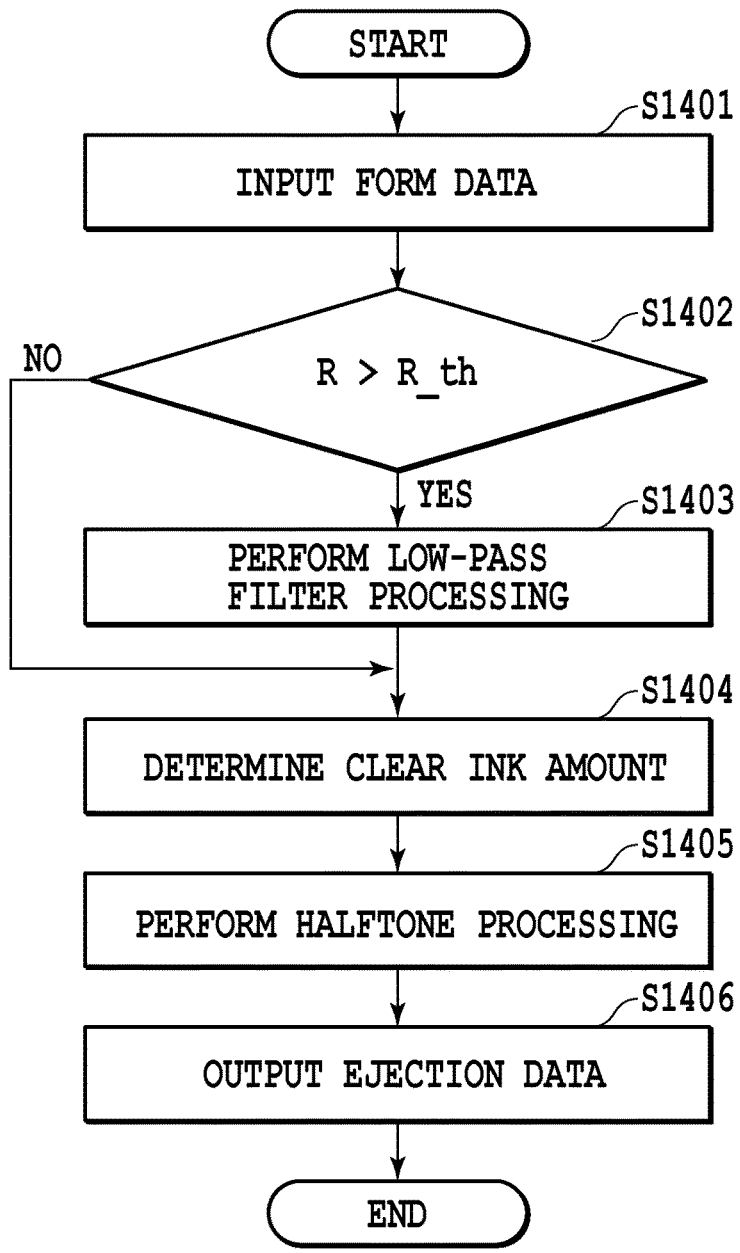
FIG. 14 is a flowchart showing an operation of a low-pass filter unit.

FIG. 14 is a flowchart showing an operation of the low-pass filter unit 1305.

First, at step S1401, the low-pass filter unit 1305 inputs the form data that is output by the application unit 1303.

Next, at step S1402, the low-pass filter unit 1305 performs processing to determine whether or not the input form data has a fine form that affects surface scattering. In the present embodiment, determination is performed by using the resolution of the form data. Specifically, the low-pass filter unit 1305 compares a resolution R [dpi] of the form data that is input at step S1401 with a predetermined resolution R_Th [dpi] that serves as a reference. The predetermined resolution R_Th that serves as a reference is a value corresponding to the predetermined area shown in FIG. 12 described previously and for example, is calculated by converting the unit from μm into dpi. For example, in the case where the predetermined area is taken to be 100 μm×100 μm, R_Th is 254 [dpi]. In the case where the resolution R of the form data is higher than the predetermined resolution R_Th that serves as a reference at step S1401, the low-pass filter unit 1305 performs low-pass filter processing at step S1403 that follows. In the present embodiment, the above-described determination is performed by using resolution, but this is not limited. For example, it may also be possible to perform the above-described determination by using a value that specifies surface roughness, such as arithmetic average roughness.

At step S1403, the low-pass filter unit 1305 performs low-pass filter processing on the form data that is input at step S1401 so that the surface form of the form layer becomes flat and smooth. The low-pass filter processing is performed for each predetermined area described above. As the low-pass filter, it is possible to use the Gaussian filter F (a, b) having the variance of magnitude of R_Th as expressed by an expression below. Here, a and b represent the positions in the scanning direction and in the sub scanning direction, respectively, in the area in which the low-pass filter processing is performed.

$$F(a, b) = \exp\left\{-\frac{a^2 + b^2}{2\left(\frac{R\_Th}{2}\right)^2}\right\}$$ (expression 15)

At step S1404, the low-pass filter unit 1305 converts the form data from which the high-frequency form has been removed into clear ink amount data that is used to form the form layer. Specifically, the low-pass filter unit 1305 converts the value of the input form data into the corresponding ink amount by using a correspondence table of the ink amount and the form data. It is possible to create the correspondence table by forming the form layer in advance by using a plurality of different pieces of ink amount data and by measuring the form data for each ink amount by using a form measuring instrument or the like. The clear ink amount data that is used to form the form layer is, for example, 8-bit data.

At step S1405, the low-pass filter unit 1305 converts the clear ink amount data into 1-bit ejection data by using the well-known halftone technique, such as the error diffusion method.

At S1406, the low-pass filter unit 1305 outputs the ejection data that is used to form the form layer to the form layer forming unit 1306.

As explained above, in the present embodiment, for each predetermined area of printed matter, the lower layer, which is the form layer plus the color development layer, is formed so that the surface form of the lower layer enters the flat and smooth state. Due to this, even in the case where the form layer exists, it is possible to implement color correction that takes into consideration only the form of the glossy layer as in the first embodiment. Consequently, it is possible to obtain the same effects as those of the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to more easily reduce a change in color that is caused by the surface form of an image to be formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-135165, filed Jul. 6, 2015, and No. 2016-119036, filed Jun. 15, 2016, which are hereby incorporated by reference wherein in their entirety.

What is claimed is:

1. An image processing apparatus that generates print data for a printing apparatus to form printed matter including a color development layer to reproduce a color and a glossy layer that is formed on the color development layer to reproduce gloss, the image processing apparatus comprising:
 a color correction unit configured to correct color data representing the color by using a correction value in accordance with gloss data representing the gloss;
 a color conversion unit configured to convert the corrected color data into color material amount data;
 a first generation unit configured to generate, based on the color material amount data, data that is used to form the color development layer among the print data and which makes the color development layer flat and smooth; and
 a second generation unit configured to generate, based on the gloss data, data that is used to form the glossy layer among the print data.

2. The image processing apparatus according to claim 1, wherein the data that is used to form the color development layer among the print data is data that makes flat and smooth the color development layer by filling gaps in the form with a clear color material, which are formed by a color material used to reproduce the color.

3. The image processing apparatus according to claim 2, wherein a total value of the data of the color material that is used to reproduce the color and the data of the clear color material is uniform for each pixel.

4. The image processing apparatus according to claim 1, wherein the correction value in accordance with the gloss data is a value that is calculated from a difference between a spectral reflectance measured from printed matter including a glossy layer having gloss represented by the gloss data and a spectral reflectance measured from printed matter including no glossy layer.

5. The image processing apparatus according to claim 4, wherein the color correction unit subtracts the correction value in accordance with the gloss data from the color data.

6. The image processing apparatus according to claim 1, wherein the color material is ink and data that is used to form the color development layer among the print data is ejection data of the ink.

7. The image processing apparatus according to claim 1, wherein the printed matter further includes form layer to reproduce a form,
 the image processing apparatus further comprising:
 a third generation unit configured to generate, based on form data representing the form, data that is used to form the form layer among the print data.

8. The image processing apparatus according to claim 7, wherein the third generation unit includes:
 a determination unit configured to determine whether or not the form data has a fine form that affects surface scattering; and
 a high-frequency component removal unit configured to remove high-frequency components of the form data by using a high-frequency removal filter in a case where it is determined that the form data has a fine form that affects surface scattering.

9. The image processing apparatus according to claim 7, wherein a high-frequency component removal unit configured to remove high-frequency components of the form data in a case where the form data has a fine form that affects surface scattering.

10. The image processing apparatus according to claim 1, wherein the correction value in accordance with the gloss data is a value that is calculated based on a spectral reflectance measured from printed matter including a glossy layer having gloss represented by the gloss data and a spectral reflectance measured from printed matter including no glossy layer.

11. An image processing method of generating print data for a printing apparatus to form printed matter including a color development layer to reproduce a color and a glossy layer that is formed on the color development layer to reproduce gloss, the image processing method comprising the steps of:

correcting color data representing the color by using a correction value in accordance with gloss data representing the gloss;

converting the corrected color data into color material amount data;

generating, based on the color material amount data, data that is used to form the color development layer among the print data and which makes the color development layer flat and smooth; and generating, based on the gloss data, data that is used to form the glossy layer among the print data.

12. A non-transitory computer readable storage medium storing a program for causing a computer to perform an image processing method of generating print data for a printing apparatus to form printed matter including a color development layer to reproduce a color and a glossy layer that is formed on the color development layer to reproduce gloss, the method comprising:

correcting color data representing the color by using a correction value in accordance with gloss data representing the gloss;

converting the corrected color data into color material amount data;

generating, based on the color material amount data, data that is used to form the color development layer among the print data and which makes the color development layer flat and smooth; and generating, based on the gloss data, data that is used to form the glossy layer among the print data.

* * * * *